United States Patent
Lee (10) Patent No.: US 10,048,813 B2
(45) Date of Patent: *Aug. 14, 2018

(54) CAPACITIVE SENSING DEVICE AND CAPACITIVE SENSING METHOD

(71) Applicants: SALT INTERNATIONAL CORP., New Taipei (TW); IMAGINATION BROADWAY LTD., New Taipei (TW)

(72) Inventor: Shang-Li Lee, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 475 days.

This patent is subject to a terminal disclaimer.

(21) Appl. No.: 14/702,894

(22) Filed: May 4, 2015

(65) Prior Publication Data

US 2016/0179285 A1 Jun. 23, 2016

(30) Foreign Application Priority Data

Dec. 19, 2014 (TW) .............................. 103144610 A
Dec. 19, 2014 (TW) .............................. 103144611 A (51) Int. Cl.
*G06F 3/045* (2006.01)
*G06F 3/044* (2006.01)
(Continued)

(52) U.S. Cl.
CPC ............ *G06F 3/044* (2013.01); *G06F 3/0418* (2013.01); *G09G 5/003* (2013.01); *G09G 2300/0426* (2013.01)

(58) Field of Classification Search
CPC ....... G06F 3/044; G06F 3/0418; G09G 5/003; G09G 2300/0426
(Continued)

(56) References Cited

U.S. PATENT DOCUMENTS

| 9,626,054 B2 * | 4/2017 | Lee | ......................... G06F 3/044 |
| 2008/0047764 A1 * | 2/2008 | Lee | ....................... G08C 21/00 |
| | | | 178/18.06 |

(Continued)

FOREIGN PATENT DOCUMENTS

| TW | M434992 | 8/2012 |
| TW | 201320609 | 5/2013 |
| TW | 201441884 | 11/2014 |

*Primary Examiner* — Amit Chatly
(74) *Attorney, Agent, or Firm* — Eric W. Cernyer; James W. Huffman (57) ABSTRACT

A capacitive sensing method includes detecting present measured values of plural reference points selected from plural sensing points, generating a present difference value according to the present measured values of the reference points and one or more reference measured values, obtaining a selected adjustment factor according to a relation setting and the present difference value, detecting present measured values of the sensing points, generating plural position signals of the sensing points according to the present difference values of the sensing points, adjusting the position signals according to the selected adjustment factor, and controlling the output of the adjusted position signals according to a reference signal. The sensing points are defined by electrodes intersected with one another and configured to form an array. The reference points are located at the periphery of the array. The relation setting is the relationship between signal difference values and adjustment factors.

10 Claims, 9 Drawing Sheets

(51) Int. Cl.
*G09G 5/00* (2006.01)
*G06F 3/041* (2006.01)

(58) Field of Classification Search
USPC .................................................. 345/173–178
See application file for complete search history.

(56) References Cited

U.S. PATENT DOCUMENTS

2013/0176273 A1    7/2013  Li et al.
2014/0160070 A1*   6/2014  Miyamoto ............ G06F 3/0416
                                                345/174

* cited by examiner

CAPACITIVE SENSING DEVICE AND CAPACITIVE SENSING METHOD

CROSS-REFERENCES TO RELATED APPLICATIONS

This non-provisional application claims priority under 35 U.S.C. § 119(a) on Patent Application No. 103144610 and 103144611, filed in Taiwan, R.O.C. on 2014 Dec. 19, the entire contents of which are hereby incorporated by reference.

This application is related to U.S. application Ser. No. 14/702,909, entitled "CAPACITIVE SENSING DEVICE AND CAPACITIVE SENSING METHOD", with an inventor LEE, SHANG-LI, that is being filed on the same day as the present application.

BACKGROUND

Technical Field

The instant disclosure relates to capacitive sensing technologies; in particular, to a capacitive sensing device and a capacitive sensing method capable of reducing the influence from transient environmental changes.

Related Art

For the sake of improving convenience of usage, more and more electronic devices adopt touch screens as operating interfaces. A user can touch graphics displayed on a touch screen of an electronic device for manipulating the electronic device. Comparing to button-based manipulations or other manipulation methods, touch-based manipulations are quicker, more convenient, and more ergonomic. The touch screen mainly includes a display device providing a displaying function and a sensing device providing a touching function.

These sensing devices can be classified, according to the structures and the principles applied, into several sensing types, such as resistive sensing, capacitive sensing, acoustic sensing, optic sensing (e.g., infrared ray sensing), and electromagnetic sensing. Specifically, the capacitive sensing devices (i.e., sensing devices belonging to capacitive sensing type) do not require materials having good properties in terms of stress and strain, and are not easily affected by environment light. Furthermore, the manufacturing process of the capacitive sensing devices is simpler than other types of sensing devices. Therefore, most of touch screens which are recently manufactured intend to adopt the capacitive sensing device for the touch-based manipulation.

A conventional capacitive sensing device includes sensing points which are defined by X electrodes and Y electrodes and are configured in an array form. When the user touches the conventional capacitive sensing device, a capacitance value of at least a corresponding sensing point on which the user touches would be changed, and then the conventional capacitive sensing device identifies that a touch manipulation occurs by detecting a change of the capacitance value of the sensing point. However, when the environment of the conventional capacitive sensing device transiently changes (e.g., temperature change in a short period of time), the capacitive value of the sensing point would increase or decrease according to the environment temperature, such that the conventional capacitive sensing device would misjudge the change of the capacitive value of the sensing point as a touch manipulation.

SUMMARY

Therefore, the instant disclosure provides a capacitive sensing method and a device therefor to more correctly sense the touch manipulation.

In one embodiment, a capacitive sensing method is provided and comprises steps of: detecting present measured values of a plurality of reference points selected from a plurality of sensing points; generating a present difference value according to the present measured values of the reference points and at least one reference measured value; obtaining a selected adjustment factor according to a relation setting and the present difference value; detecting present measured values of the sensing points; generating a plurality of position signals of the sensing points according to the present difference values of the sensing points; adjusting the position signals according to the selected adjustment factor; and controlling the output of the adjusted position signals according to a reference signal. Wherein, the sensing points are defined by electrodes intersected with one another, and the sensing points are configured to form an array, and wherein the reference points are located at the periphery of the array. Wherein, the relation setting is the relationship between signal difference values and adjustment factors.

In one embodiment, a capacitive sensing device comprises a storage unit, a signal sensor, a driving/sensing unit, and a position sensing unit. The storage unit stores a relation setting, at least one reference measured value, and a reference signal. Wherein, the relation setting is the relationship between signal difference values and adjustment factors. The signal sensor comprises a plurality of first electrodes and a plurality of second electrodes. Wherein, the first electrodes are intersected with the second electrodes, and wherein the first electrodes and the second electrodes define a plurality of sensing points configured as an array. The driving/sensing unit is connected to the first electrodes and the second electrodes for detecting present measured values of the sensing points and generating a plurality of position signals according to the present measured values. The position sensing unit is connected to the driving/sensing unit and the storage unit for generating a present difference value according to present measured values of a plurality of reference points selected from the sensing points and the reference measured value, obtaining a selected adjustment factor from the adjustment factors according to the relation setting and the present difference value, adjusting the position signals according to the selected adjustment factor, and controlling the output of the adjusted position signals according to the reference signal. Wherein, the reference points are located at the periphery of the array.

According to the capacitive sensing device and the capacitive sensing method of the instant disclosure, the device detects the signals of the selected reference points in cycles. Based on the detection result, the default background noises (i.e., the reference measured values), and the relation settings for indicating the effect of temperature change to the position signals, the device can obtain the impact of temperature change on the position signals rapidly and adjust the position signals correspondingly. Therefore, the accuracy of a signal-reading process can be maintained over time and the response speed for temperature change can be improved.

Detailed description of the characteristics and the advantages of the disclosure is shown in the following embodiments, the technical content and the implementation of the disclosure should be readily apparent to any person skilled in the art from the detailed description, and the purposes and the advantages of the disclosure should be readily understood by any person skilled in the art with reference to content, claims and drawings in the disclosure.

DETAILED DESCRIPTION

Figure 1:
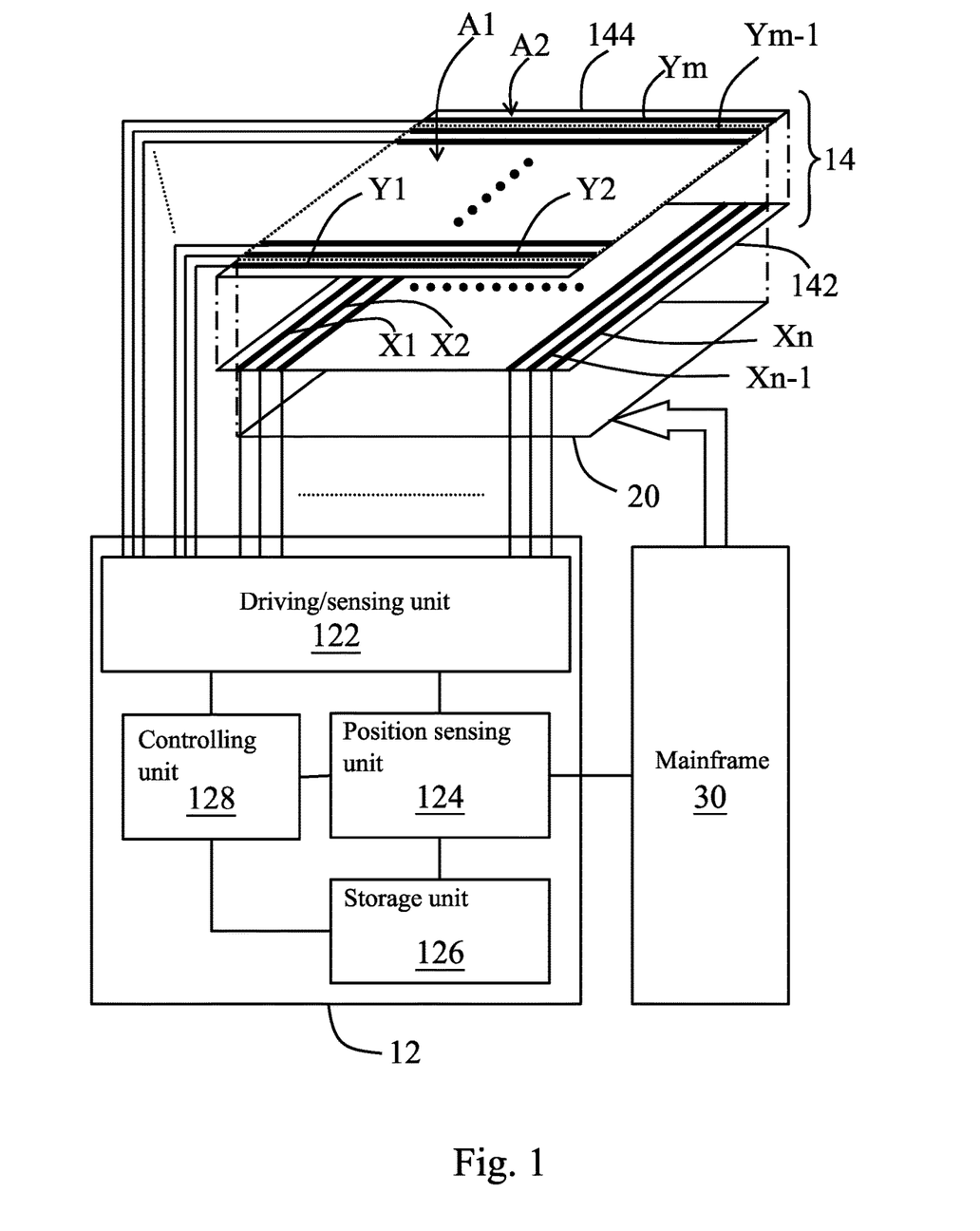
FIG. 1 illustrates a schematic block diagram of a capacitive sensing device according to an embodiment of the instant disclosure.

Please refer to FIG. 1, illustrating a schematic block diagram of a capacitive sensing device according to an embodiment of the instant disclosure. As shown in FIG. 1, a touch screen comprises a capacitive sensing device, a display device 20, and a mainframe 30. The capacitive sensing device comprises a controller 12 and a signal sensor 14. The signal sensor 14 is connected to the controller 12, and the signal sensor 14 is disposed on a displaying surface of the display device 20. The signal sensor 14 comprises a number of electrodes (e.g., a plurality of first electrodes X1, X2-Xn−1, Xn and a plurality of second electrodes Y1, Y2-Ym−1, Ym) intersected with one another (the first electrodes are intersected with the respective second electrodes). Wherein, n and m are positive integers and n may be equal to or not equal to m.

In some embodiments, the first electrodes X1, X2-Xn−1, Xn and the second electrodes Y1, Y2-Ym−1, Ym may be respectively disposed on different planes. In other words, the signal sensor 14 comprises a first sensing layer 142 and a second sensing layer 144. The second sensing layer 144 is disposed above the first sensing layer 142, and the first sensing layer 142 is disposed on the displaying surface of the display device 20. An insulating layer may be, but not limited to, disposed between the first sensing layer 142 and the second sensing layer 144.

Figure 2:
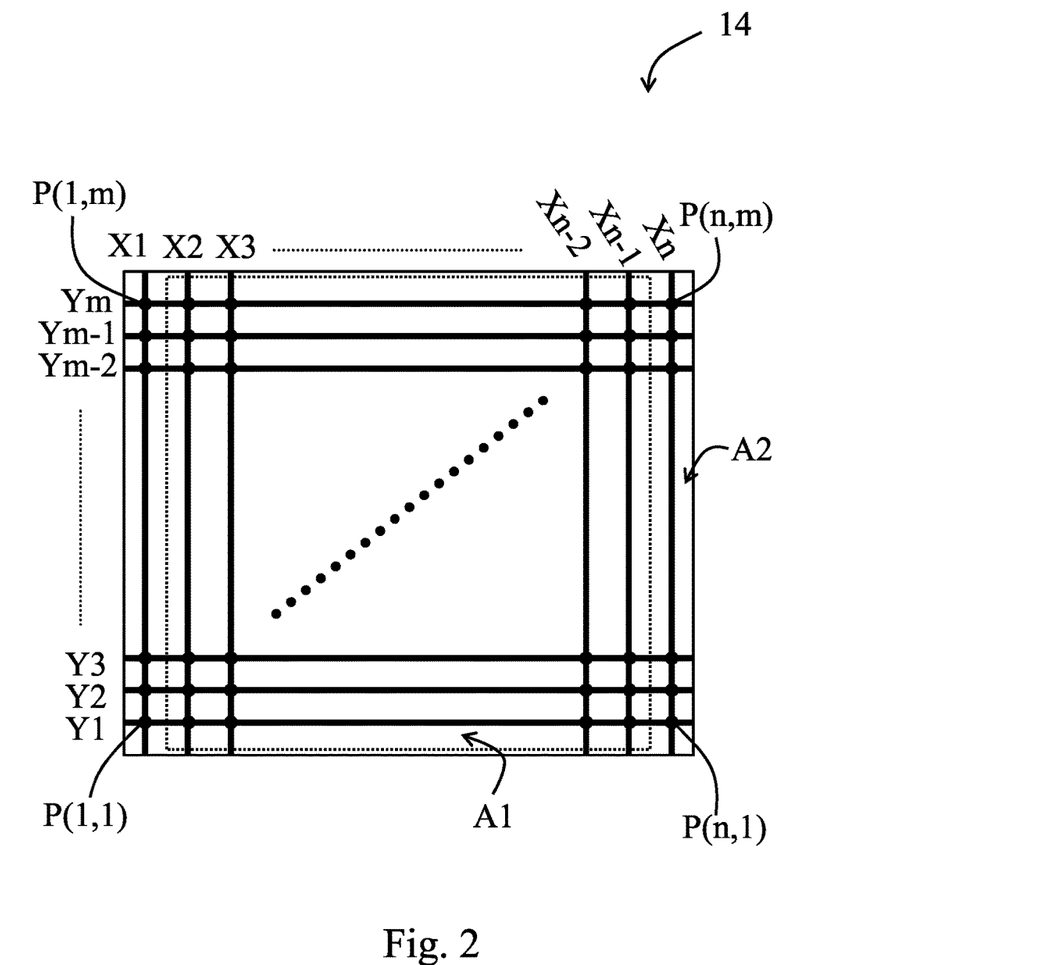
FIG. 2 illustrates a top view of a signal sensor.

The first sensing layer 142 comprises a number of electrodes (i.e., the first electrodes X1, X2-Xn−1, Xn) configured in a pattern form. The first electrodes X1, X2-Xn−1, Xn are parallel with one another. Likewise, the second sensing layer 144 comprises a number of electrodes (i.e., the second electrodes Y1, Y2-Ym−1, Ym) configured in a pattern form. As shown in FIG. 2, the first electrodes X1, X2-Xn−1, Xn are intersected with the second electrodes Y1, Y2-Ym−1, Ym to define a plurality of sensing points P(1,1)-P(n,m) configured as an array. That is, the first electrodes X1, X2-Xn−1, Xn and the second electrodes Y1, Y2-Ym−1, Ym corporately form a plane coordinate system. In this embodiment, the first electrodes X1, X2-Xn−1, Xn and the second electrodes Y1, Y2-Ym−1, Ym corporately form, but are not limited to, a Cartesian coordinate system. In other embodiments, the plane coordinate system may be a polar coordinate system, non-rectangular coordinate system, or other kinds of plane coordinate systems. In some embodiments, a top view of the intersected first electrodes X1, X2-Xn−1, Xn and second electrodes Y1, Y2-Ym−1, Ym may show a repeated rhombus pattern, a grid pattern, or a railing pattern.

In addition, the first electrodes X1, X2-Xn−1, Xn and the second electrodes Y1, Y2-Ym−1, Ym may be disposed on the same plane. That is, the first electrodes X1, X2-Xn−1, Xn and the second electrodes Y1, Y2-Ym−1, Ym are disposed on a single sensing layer.

Sensing layers (e.g., the first sensing layer 142 and the second sensing layer 144) may be transparent or translucent. Therefore, by seeing through all of the sensing layers, contents displayed on the displaying surface by the display device 20 are visible to a user. In other words, light rays emitted from the display device 20 can penetrate and pass through all of the sensing layers to reach the eyes of the user. In some embodiments, the sensing layers may be patterned electric conductive thin films, such as but not limited to, indium tin oxide (ITO) films.

An area of the display device 20 utilized for displaying contents is generally called an active area. An area on which the signal sensor 14 overlaps the active area is called a sensing area A1. Any touch events occurred on the sensing area A1 can be detected by the signal sensor 14. The term "touch event" means a physical touch (i.e., at least one finger or at least one object directly touches the signal sensor 14) or a near touch (i.e., at least one finger or at least one object extremely closes to but do not directly touches the signal sensor 14). In some embodiments, all of the sensing points P(1, 1)-P(n, m) of the signal sensor 14 are located in the active area, meaning that the signal sensor 14 is devoid of invalid areas A2. In some embodiments, part of the sensing points P(1, 1)-P(1, m) and P(n, 1)-P(n, m) of the signal sensor 14 are not located in the active area, meaning that the signal sensor 14 comprises an invalid area A2 located at the periphery of the sensing area A1. Any touch event occurred on the invalid area A2 cannot be detected by the signal sensor 14.

During the operation of the touch screen, the mainframe 30 transmits contents to be displayed to the display device 20 of the touch screen, and the display device 20 displays a graphics having the contents to be displayed. When the user touches a specific position of the capacitive sensing device on which the display device 20 overlaps according to the graphics displayed by the display device 20, the capacitive sensing device responds to the touch event and then transmits a position signal corresponding to the specific position to the mainframe 30 for a further processing. Here, what the further processing does depends on an executing command corresponding to the touched specific position to which an area of the graphics of the display device 20 corresponds. For example, the mainframe 30 may, but not limited to, respond to the position signal to execute a certain application or to display a brush stroke on the area of the display device 20 corresponding to the touched specific position. In other words, the mainframe 30 can receive the position signal from the capacitive sensing device and can be configured to initiate a certain operation based on the position signal.

Next, the controller 12 comprises a driving/sensing unit 122, a position sensing unit 124, a storage unit 126, and a control unit 128. The driving/sensing unit 122 comprises a driving component and a sensing component. Depending on different situations, the driving component may be integrated with the sensing component, or the driving component may be separated from the sensing component and electrically connected to the sensing component. The driving/sensing unit 122 is electrically connected to the first electrodes X1, X2-Xn−1, Xn and the second electrodes Y1, Y2-Ym−1, Ym. The position sensing unit 124 is electrically connected to the driving/sensing unit 122, the storage unit 126, and the main frame 30. The control unit 128 is electrically connected to the driving/sensing unit 122, the position sensing unit 124, and the storage unit 126. Here, the control unit 128 is utilized for controlling the driving/sensing unit 122.

When the controller 12 detects any touch event triggered by a user, the driving/sensing unit 122 detects a measured value of each of the sensing points by capacitive sensing technologies like self-capacitance detection or mutual capacitance detection. Here, the measured values may be voltages, currents, the charge/discharge times, or other parameters of the sensing points. In other words, a present measured value of each of the sensing points is detected by the driving/sensing unit 122, and a capacitance value or a change of capacitance value of each of the sensing points (i.e., the position signal) is obtained according to the detected present measured value and the corresponding reference measured value of each of the sensing points by the position sensing unit 124.

Here, the sensing points located at a designated position are selected to be reference points. Preferably, the selected sensing points (i.e., the reference points) may be in the invalid area A2, or the selected sensing points may be in the sensing area A1 but has less chance in occurrence of the touch event. Namely, those sensing points in the periphery of the array of the sensing points P(1,1)-P(n,m) are selected to be the reference points.

During a normal working cycle, the control unit 128 controls the driving/sensing unit 122 to detect signals of the reference points by a certain detecting frequency. Here, the certain detecting frequency may be, but not limited to, 2-5 seconds per scan.

Figure 3:
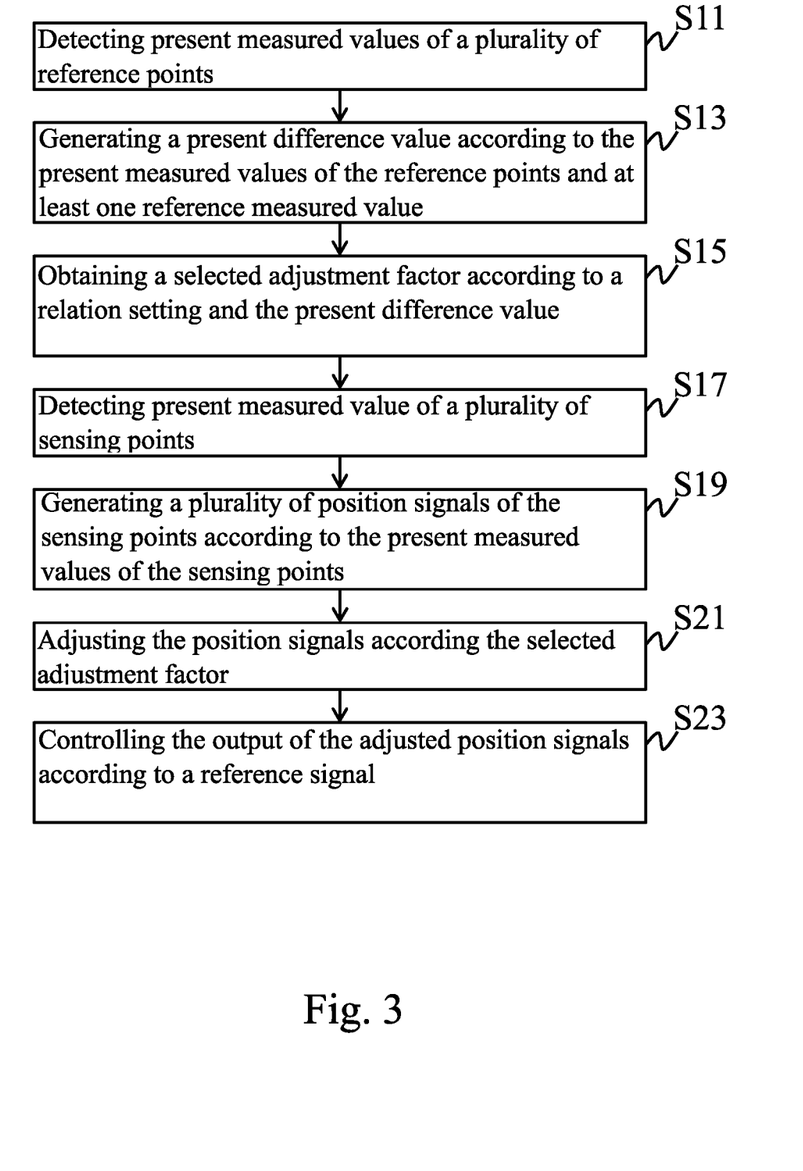
FIG. 3 illustrates a flowchart of an embodiment of a capacitive sensing method according to the instant disclosure.

Referring to the step S11 of FIG. 3, the control unit 128 controls the driving/sensing unit 122 to detect present measured values of the reference points. Referring to the step S13 of FIG. 3, the position sensing unit 124 generates a present difference value according to the present measured values of the reference points and at least one reference measured value. Next, referring to the step S15 of FIG. 3, the position sensing unit 124 obtains a selected adjustment factor according to a relation setting and the present difference value. Here, the relation setting is the relationship between adjustment factors and signal difference values corresponding to different temperatures.

And, referring to the step S17 of FIG. 3, the control unit 128 controls the driving/sensing unit 122 to detect present measured values of all the sensing points located in the sensing area A1. Then, referring to the step S19 of FIG. 3, the position sensing unit 124 generates a plurality of position signals of the sensing points located in the sensing area A1 according to the present measured values of the sensing points located in the sensing area A1 and the reference measured value. That is, the driving/sensing unit 122 calculates the present difference value (i.e., the capacitance value or the change of capacitance value) of each of the sensing points as the position signal of each of the sensing points according to the present measured value of each of the sensing points and the corresponding reference measured value. Next, referring to the step S21 of FIG. 3, the position sensing unit 124 adjusts the position signals according to the selected adjustment factor. Then, the position sensing unit 124 controls the output of the adjusted position signals according to a reference signal.

Figure 4:
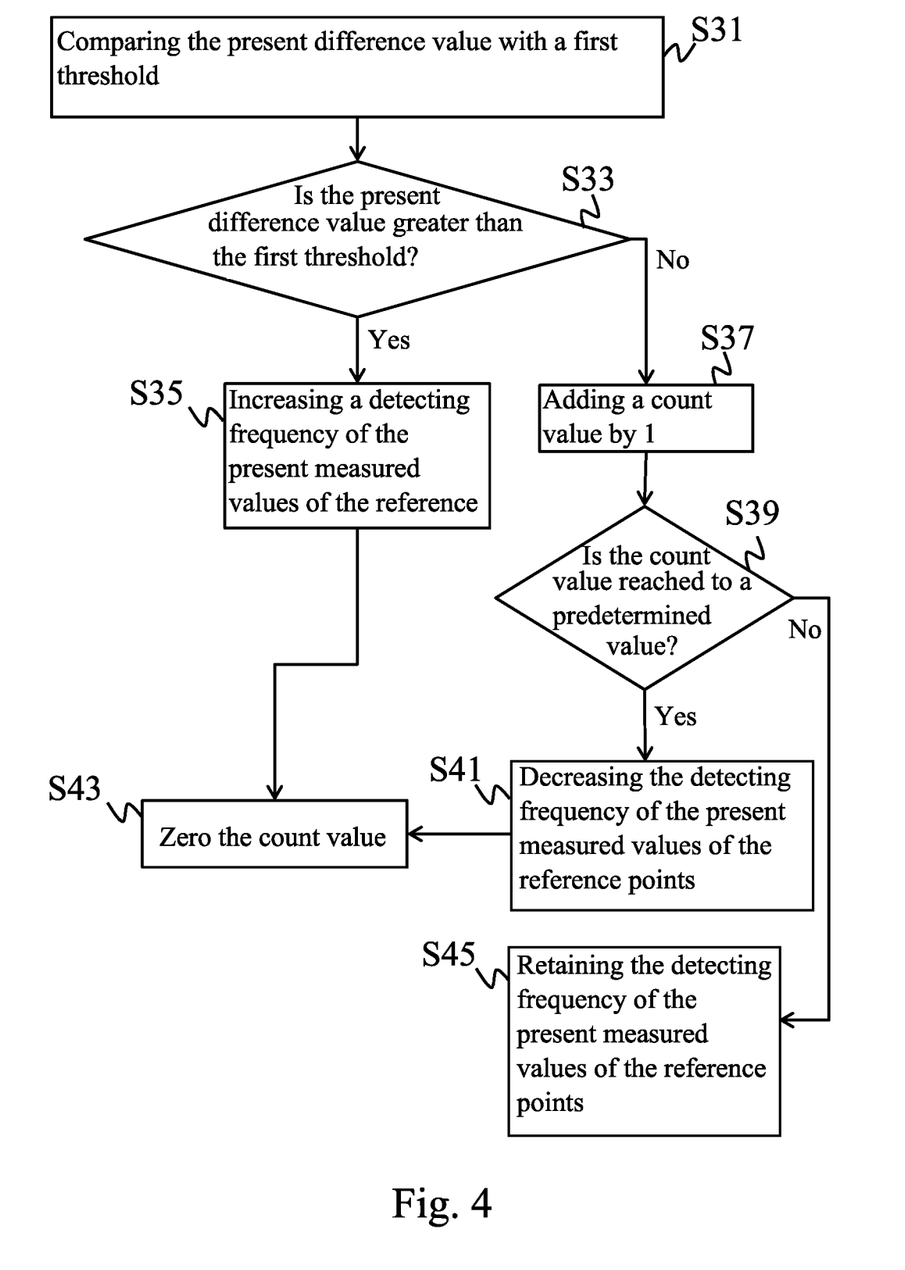
FIG. 4 illustrates a flowchart of another embodiment of a capacitive sensing method according to the instant disclosure.

In some embodiments, referring to the step S31 of FIG. 4, every time the present difference value is obtained (namely, after the step S13), the control unit 128 compares the present difference value with a threshold (hereinafter, called first threshold). Referring to the step S33 and the step S35 of FIG. 4, when the present difference value is greater than the first threshold, the control unit 128 increases the frequency of the signals of the reference points by the driving/sensing unit 122 to detect.

In some embodiments, when the present difference value is not greater than the first threshold, the control unit 128 controls a counter to add a count value by 1 (step S37), and then determines whether the count value is reached (i.e., substantially equal to or greater than) to a predetermined value or not (step S37). When the count value is reached to the predetermined value, the control unit 128 decreases the frequency of the signals of the reference points by the driving/sensing unit 122 to detect (step S41).

In addition, when the detecting frequency is confirmed to be adjusted or when the detecting frequency is adjusted (step S41 or Step S35), the control unit 128 resets the counter to zero the count value (Step S43).

Otherwise, when the count value is not reached to the predetermined value, the control unit 128 maintains the same detecting frequency (Step S45).

In some embodiments, the relation settings may be established by the following method.

Figure 5:
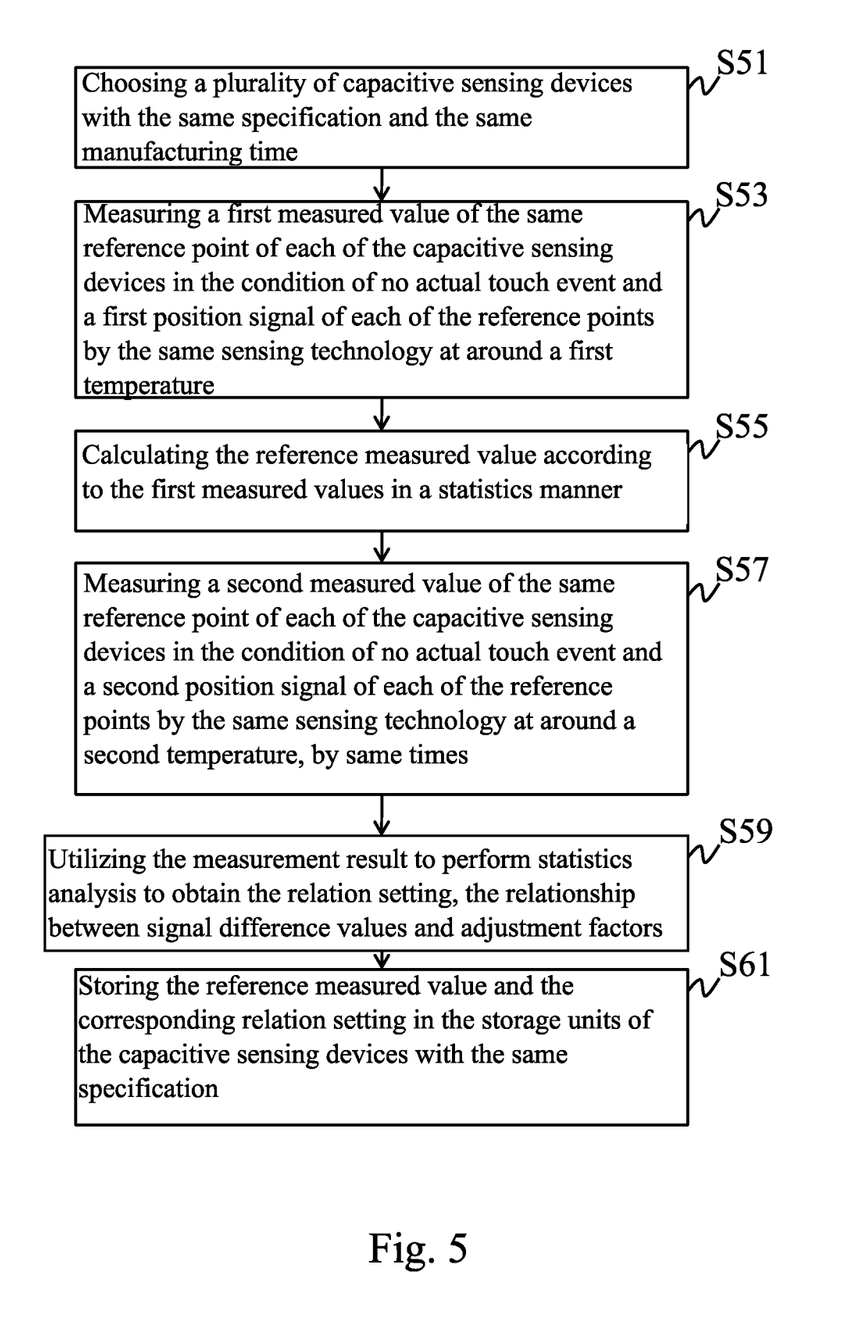
FIG. 5 is a flowchart illustrating a method for establishing relation settings in an embodiment of the capacitive sensing method according to the instant disclosure.

Referring to the step S51 of FIG. 5, a number (e.g., ten, twenty, thirty, or more) of capacitive sensing devices with the same specification (e.g., the same size and the same thickness of glass) and the same manufacturing time are chosen.

Referring to the step S53 of FIG. 5, place the capacitive sensing devices with the same specification in a temperature-controlling environment. Specifically, control the temperature of the environment at around a first temperature. The first temperature may be an ambient temperature, for instance, but not limited to, 26 degree Celsius, 27 degree Celsius, or 28 degree Celsius. Then, the same sensing technology is performed to measure, by one time or by many times, the measured value (or values) of the same reference point of each of the capacitive sensing devices in the condition of no actual touch event (called first measured value (or values)), and to measure the position signal of each of the sensing points (called first position signal).

Referring to the step S55 of FIG. 5, then, the reference measured value is calculated according to the first measured values in a statistics manner.

In one embodiment, the reference measured value may be the mean value of the first measured values obtained at the same reference point of different devices (that is, the position of a first reference point of a first capacitive sensing device corresponds to the position of a first reference point of a second capacitive sensing device, and so on). Besides, before obtaining the mean value of the first measured values, the outliers of the first measured values may be deleted in advance. Next, in the step S13, the present difference value is the statistical values of individual difference values. Each of individual difference values is the difference between the present measured value of each of the reference points and each corresponding reference measured value at the same reference point. The statistical value may be, but not limited to, mean, median, or mode.

In another embodiment, the reference measured value may be the mean value of the first measured values obtained at all reference points of different devices. Accordingly, the reference measured value corresponds to all the reference points of different devices. Besides, before obtaining the mean value of the first measured values, the outliers of the first measured values may be deleted in advance. Next, in the step S13, the present difference value is the statistical values of individual difference values. Each of individual difference values is the difference between the present measured value of each of the reference points and the same reference measured value. The statistical value may be, but not limited to, mean, median, or mode.

In yet another embodiment, the reference measured value may be the mean value of the first measured values obtained at all the reference points of at least one electrode located at the same position of different devices. Accordingly, the reference measured value corresponds to all the reference points of different devices. Besides, before obtaining the mean value of the first measured values, the outliers of the first measured values may be deleted in advance. Next, in the step S13, the present difference value is the statistical values of individual difference values. Each of individual difference values is the difference between the present measured value of each of the reference points and the corresponding reference measured value at the same reference point. The statistical value may be, but not limited to, mean, median, or mode.

Wherein, a method of deleting the first measured values having greater deviations may be, but not limited to, deleting the one having the greatest value, deleting the one having the least value, deleting the ones respectively having the greatest value and the least value, or deleting the outliers of the first measured values.

Referring to the step S57 of FIG. 5, place the capacitive sensing devices with the same specification in a temperature-controlling environment. Specifically, control the temperature of the environment at around a number of second temperatures higher than or lower than the first temperature. Then, the same sensing technology is performed to measure, by same times, the measured value (or values) of the same reference point of each of the capacitive sensing devices in the condition of no actual touch event (called second measured value (or values)), and to measure the position signal of each of the sensing points (called second position signal).

Referring to the step S59 of FIG. 5, utilizing the measurement result (i.e., the first measured values and the corresponding first position signals at around the first temperature, and the second measured values and the corresponding second position signals at around the second temperatures) to perform statistics analysis to obtain the relation setting, the relationship between signal difference values (representing the temperature change between the first temperature and the second temperatures), and adjustment factors (representing the signal change between the first position signals and the second position signals). Here, the relation setting may be a lookup table between the signal difference values and the adjustment factors, a curve plotted by the signal difference value and the adjustment factors, or an equation relating to the signal difference values and the adjustment factors. In one embodiment of the step S15, the position sensing unit 124 figures out the signal difference value matching with the present difference value in the relation setting, and then, the position sensing unit 124 further obtains the adjustment factor corresponding to the signal difference value matching with the present difference value (i.e., the selected adjustment factor). In another embodiment of the step S15, the position sensing unit 124 substitutes the present difference value into the relation setting to obtain the corresponding adjustment factor (namely, the selected adjustment factor).

For a temperature range defined by a first temperature and a second temperature in Celsius, the temperature scale is at least one degree per indicium (e.g., 1 C, 2 C, 5 C, 10 C). When the magnitude of the indicium is rather less, the signal difference values corresponding to different temperatures may be the same. Besides, different signal difference values may correspond to adjustment factors having the same value.

Next, referring to the step S61 of FIG. 5, the reference measured value and the corresponding relation setting are stored in the storage units of the capacitive sensing devices with the same specification for the further use in the step S13 and the step S15.

In some embodiments, the reference points may be defined at a k number of electrodes (X1-Xk, Xn-k-1-Xn, Y1-Yk, Ym-k-1-Ym, hereinafter called reference electrodes) located at the periphery of the array. Wherein, k is a positive integer and is less than n or less than m. Preferably, k is a positive integer and is less than n/10 or less than m/10. More preferably, k is 1 or 2. Here, the reference points may be one sensing point, a number of sensing points or all the sensing points of each of the reference electrodes.

In addition, for each of the reference electrodes, any two adjacent reference points are spaced by one or more sensing points which are not the reference points. Moreover, for each of the reference electrodes, the number of the spaced sensing points between any two adjacent reference points is the same.

In some embodiments, the reference points are sensing points at corners of the array. That is, the reference points are an a*b number of sensing points located at the corners of the array. Here, a is a positive integer and is less than n. Preferably, a is a positive integer and is less than n/10. More preferably, a is 1 or 2. Moreover, b is a positive integer and is less than m. Preferably, b is a positive integer and is less than m/10. More preferably, b is 1 or 2.

In some embodiments, the reference points are the sensing points located in the invalid area A2. For example, one or more of the sensing points (P(1,1)-P(1,m), P(n,1)-P(n,m)) may be the reference points.

In some embodiments, the touch screen is assembled to an apparatus (e.g., the mainframe 30) to compose a single integrated electronic device. In the situation, the selection of the reference point prefers to avoid a heat source of the apparatus. In other words, selecting sensing points which are not in an area near or above the heat source of the apparatus to be the reference points is preferable.

Here, the reference points utilized in the measuring step for measuring the first measured values in the step S11 and the step S53 are the same as the reference points utilized in the measuring step for measuring the second measured values in the step S57.

Figure 6:
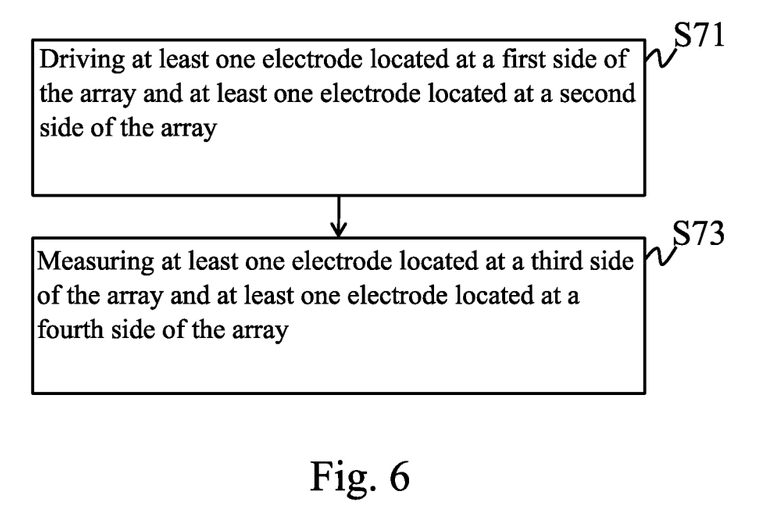
FIG. 6 is a flowchart illustrating a method for measuring values of reference points of an embodiment of the capacitive sensing method according to the instant disclosure.

Details about the measuring step for measuring the first measured values in the step S11 and the step S53 and the measuring step for measuring the second measured values in the step S57 are further described. Referring to FIG. 1, FIG. 2, and FIG. 6, in a first embodiment of the measuring step for measuring the first measured values in the step S11 and the step S53 and the measuring step for measuring the second measured values in the step S57, the reference points are a 2*1 number of sensing points located at each corner of the array (for example, P(1,1) and P(2,1), P(1,m) and P(2,m), P(n,1) and P(n−1,1), and P(n,m) and P(n−1,m)), and the driving/sensing unit 122 drives two first electrodes X1, X2 located at a first side of the array and two first electrodes Xn−1, Xn located at a second side of the array (step S71). Wherein, the first side is opposite to the second side.

Next, the driving/sensing unit 122 measures one second electrode Y1 located at a third side of the array and one second electrode Yn located at a fourth side of the array to obtain the present measured values of the reference points (step S73). Wherein, the third side is opposite to the fourth side. The third side is connected between one of two ends of the first side and one of two ends of the second side, and the fourth side is connected between the other end of the first side and the other end of the second side.

In other words, as shown in FIG. 2, the driving/sensing unit 122 drives the leftmost two first electrodes X1, X2 and the rightmost two first electrodes Xn, Xn−1 of the signal sensor 14. And then, the driving/sensing unit 122 measures the topmost one second electrode Ym and the bottommost one second electrode Y1 of the signal sensor 14.

In a second embodiment of the measuring step for measuring the first measured values in the step S11 and the step S53 and the measuring step for measuring the second measured values in the step S57, the reference points are one sensing point located at each corner of the array (for example, P(1,1), P(1,m), P(n,1), and P(n,m)), and the driving/sensing unit 122 drives one first electrode X1 located at the first side of the array (i.e., the leftmost first electrode) and one first electrode Xn located at the second side of the array (i.e., the rightmost first electrode) (step S71). Next, the driving/sensing unit 122 measures one second electrode Ym located at the third side of the array (i.e., the topmost second electrode) and one second electrode Y1 located at the fourth side of the array (i.e., the bottommost second electrode) to obtain the present measured values of the reference points (step S73).

In a third embodiment of the measuring step for measuring the first measured values in the step S11 and the step S53 and the measuring step for measuring the second measured values in the step S57, the reference points are a 1*2 number of sensing points located at each corner of the array (for example, P(1,1) and P(1,2), P(1,m) and P(1,m−1), P(n,1) and P(n,2), and P(n,m−1) and P(n,m)), and the driving/sensing unit 122 drives one first electrode X1 located at the first side of the array and one first electrode Xn located at the second side of the array (step S71). Next, the driving/sensing unit 122 measures two second electrodes Ym, Ym−1 located at the third side of the array and two second electrodes Y1, Y2 located at the fourth side of the array to obtain the present measured values of the reference points (step S73).

Figure 7:
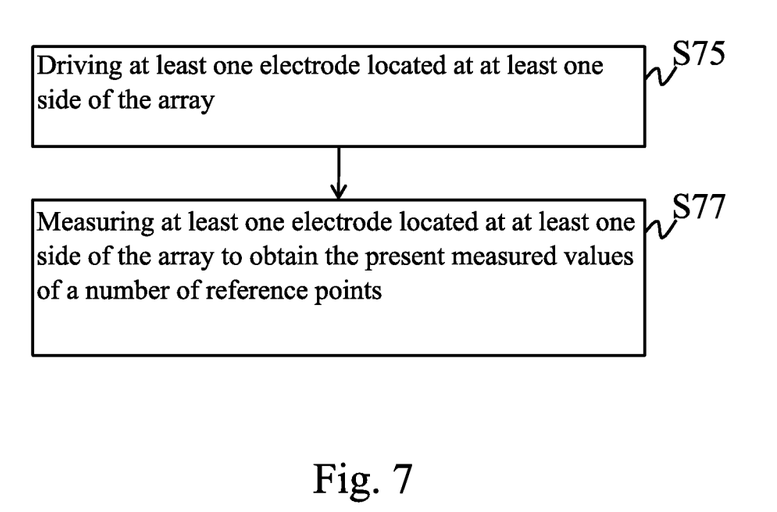
FIG. 7 is a flowchart illustrating a method for measuring values of reference points of another embodiment of the capacitive sensing method according to the instant disclosure.

Referring to FIG. 1, FIG. 2, and FIG. 7, in a fourth embodiment of the measuring step for measuring the first measured values in the step S11 and the step S53 and the measuring step for measuring the second measured values in the step S57, the reference points are the sensing points located at one electrode of the first side of the array, and the driving/sensing unit 122 adopts the self-capacitance detection. The driving/sensing unit 122 drives one first electrode X1 located at the first side of the array (step S75) and measures the first electrode X1 to obtain present measured values of a number of reference points (i.e., the sensing points P(1,1)-P(1,m)) (step S77). In this embodiment, the reference points (i.e., the sensing points P(1,1)-P(1,m)) are located in the invalid area A2.

In a fifth embodiment of the measuring step for measuring the first measured values in the step S11 and the step S53 and the measuring step for measuring the second measured values in the step S57, the reference points are the sensing points located at two electrodes of the first side of the array, and the driving/sensing unit 122 adopts the self-capacitance detection. The driving/sensing unit 122 drives the two first electrode X1, X2 located at the first side of the array (step S75) and measures the two first electrodes X1, X2 to obtain present measured values of a number of reference points (i.e., the sensing points P(1,1)-P(1,m) and P(2,1)-P(2,m)) (step S77).

In a sixth embodiment of the measuring step for measuring the first measured values in the step S11 and the step S53 and the measuring step for measuring the second measured values in the step S57, the reference points are the sensing points located at one electrode of each of the sides of the array, and the driving/sensing unit 122 adopts the self-capacitance detection. The driving/sensing unit 122 drives and measures one first electrode X1 located at the first side of the array to obtain present measured values of a number of reference points (i.e., the sensing points P(1,1)-P(1,m)). Next, the driving/sensing unit 122 drives and measures one first electrode Xn located at the second side of the array to obtain present measured values of a number of reference points (i.e., the sensing points P(n,1)-P(n,m)). Then, the driving/sensing unit 122 drives and measures one second electrode Ym located at the third side of the array to obtain present measured values of a number of reference points (i.e., the sensing points P(1,m)-P(n,m)). And, the driving/sensing unit 122 drives and measures one second electrode Y1 located at the fourth side of the array to obtain present measured values of a number of reference points (i.e., the sensing points P(1,1)-P(n,1)). In this embodiment, some of the reference points (i.e., sensing points P(1,1)-P(1,m) and P(n,1)-P(n,m)) are located in the invalid area A2.

Figure 8:
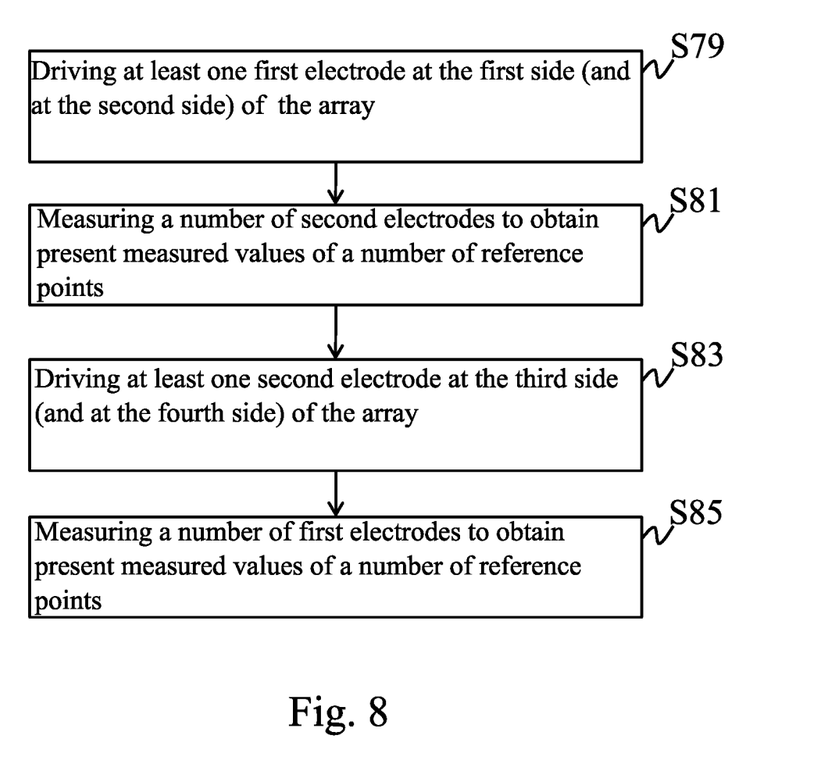
FIG. 8 is a flowchart illustrating a method for measuring values of reference points of yet another embodiment of the capacitive sensing method according to the instant disclosure.

Referring to FIG. 1, FIG. 2, and FIG. 8, in a seventh embodiment of the measuring step for measuring the first measured values in the step S11 and the step S53 and the measuring step for measuring the second measured values in the step S57, the reference points are an i number of sensing points located at one first electrode X1 of the first side of the array, and the driving/sensing unit 122 adopts the self-capacitance detection. Wherein, i is a positive integer between 1 to m. Preferably, i is less than m. More preferably, i is less than m/2. The driving/sensing unit 122 drives the first electrode X1 located at the first side of the array (step S79). And then, the driving/sensing unit 122 measures an i number of second electrodes to obtain present measured values of a number of reference points (step S81). Here, each two measured second electrodes are spaced by one or more unmeasured second electrodes. In addition, any two adjacent measured second electrodes may be spaced by a constant number of unmeasured second electrodes. Alternatively, any two adjacent measured second electrodes may be spaced by a different number of unmeasured second electrodes. For example, if the number of the second electrodes is sixteen, the first, fifth, ninth, and thirteenth second electrodes Y1, Y5, Y9, Y13 are measured in the step S77 to obtain present measured values of a number of reference points (i.e., sensing points P(1,1), P(1,5), P(1,9), and P(1,13)). Here, one first electrode is driven, but embodiments are not limited thereto. Optionally, the driving/sensing unit 122 may drive a number of first electrodes located at the same side of the array or drive a number of first electrodes each located at different sides of the array.

In an eighth embodiment of the measuring step for measuring the first measured values in the step S11 and the step S53 and the measuring step for measuring the second measured values in the step S57, the driving/sensing unit 122 further drives one first electrode located at the second side of the array (step S79), and measures an i number of second electrodes to obtain present measured values of a number of reference points (step S81). Similar to the foregoing embodiment, if the number of the second electrodes is sixteen, the driving/sensing unit 122 would obtain present measured values of a number of reference points (i.e., sensing points P(1,1), P(1,5), P(1,9), P(1,13), P(n,1), P(n,5), P(n,9), and P(n,13)).

In a ninth embodiment of the measuring step for measuring the first measured values in the step S11 and the step S53 and the measuring step for measuring the second measured values in the step S57, the driving/sensing unit 122 firstly obtains present measured values of parts of reference points in the step S81. And then, the driving/sensing unit 122 drives one second electrode Ym located at the third side of the array (step S83), and measures a j number of first electrodes to obtain present measured values of rest of the reference points (step S85). Here, j is a positive integer between 1 to n. Preferably, j is less than n. More preferably, j is less than n/2. In addition, each two measured first electrodes are spaced by one or more unmeasured first electrodes. Further, any two adjacent measured first electrodes may be spaced by a constant number of unmeasured second electrodes. Alternatively, any two adjacent measured second electrodes may be spaced by a different number of unmeasured first electrodes. Similar to the foregoing embodiment, if the number of the first electrodes is sixteen, in the step S85, the driving/sensing unit 122 would measure, in an arithmetic manner, the first, fifth, ninth, and thirteenth electrodes X1, X5, X9, X13 to obtain present measured values of a number of reference points (i.e., sensing points P(1,1), P(5,1), P(9,1), and P(13,1)). Here, one second electrode is driven, but embodiments are not limited thereto. Optionally, the driving/sensing unit 122 may drive a number of second electrodes located at the same side of the array or drive a number of second electrodes each located at different sides (i.e., the third side and the fourth side) of the array.

In a tenth embodiment of the measuring step for measuring the first measured values in the step S11 and the step S53 and the measuring step for measuring the second measured values in the step S57, all the reference points are located in the invalid area A2. Therefore, the driving/sensing unit 122 drives and/or measures the first electrodes X1, Xn. While in the step S17, the driving/sensing unit 122 does not drive and/or measures the first electrodes X1, Xn.

Here, the driving/sensing unit 122 sequentially drives the electrodes and sequentially then measures the electrodes. Alternatively, in a multiprocessing manner, the driving/sensing unit 122 may simultaneously drive a number of electrodes which are aligned along the same direction, and the driving/sensing unit may simultaneously measure a number of electrodes which are aligned along the same direction.

In some embodiments, the storage unit 126 stores a plurality of sets of reference measured values and relation settings corresponding thereto. Here, each set of reference measured values correspond to a temperature (i.e., correspond to one or more signal difference values). In other words, the sets of reference measured values correspond to different temperatures.

Figure 9:
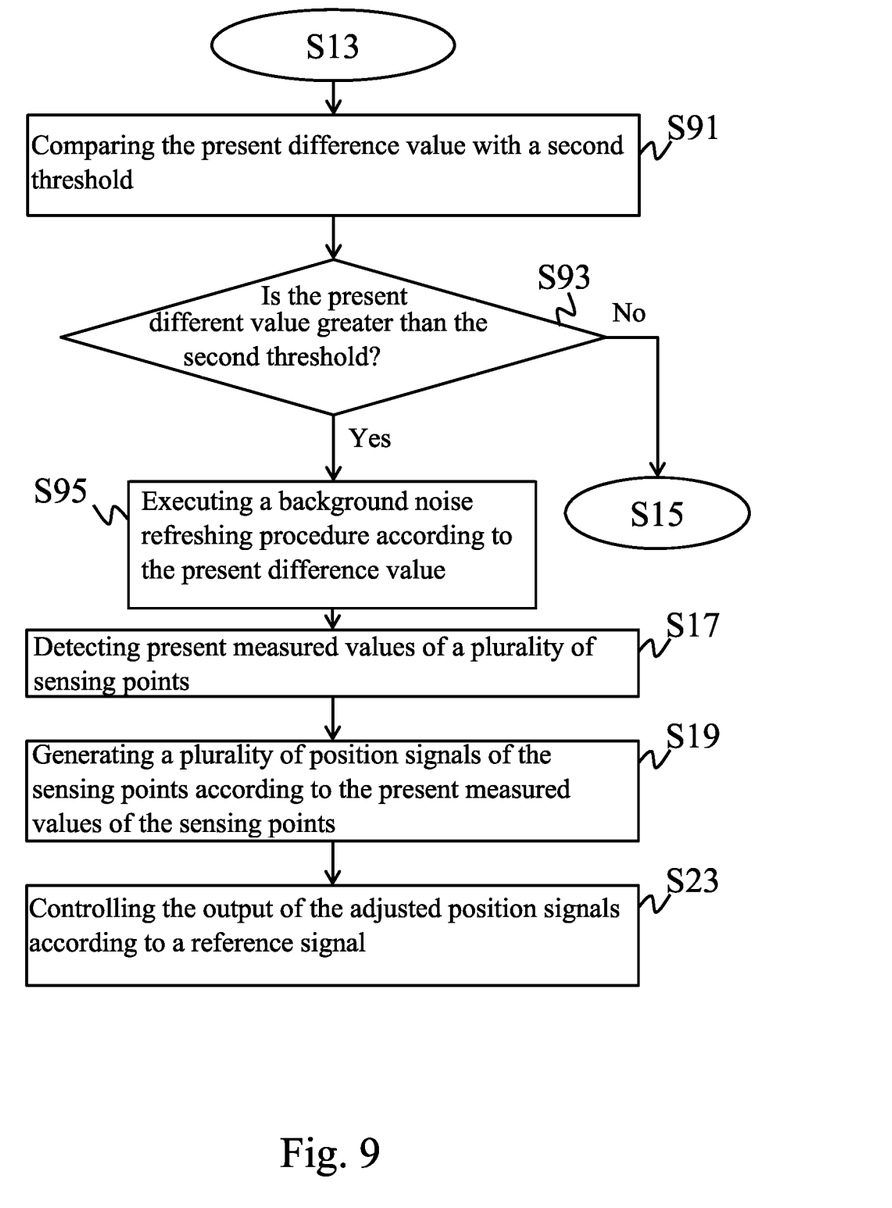
FIG. 9 is a flowchart of yet another embodiment of a capacitive sensing method according to the instant disclosure.

Please refer to FIG. 9, every time after the present difference value is obtained (i.e., after the step S13), the control unit 128 would then compare the present difference value with another threshold (hereinafter called second threshold) (step S91). When the present difference value is greater than the second threshold (step S93), the control unit 128 executes a procedure for refreshing background noise (hereinafter, called refreshing procedure) (step S95) so as to replace the reference measured value which is currently used with a set of reference measured values which is more dependent upon current environment (e.g., environment temperature) and with the relation settings. Next, the step S17, step S19 and step S23 are executed sequentially (without the execution of the step S21). Base on the step S93, when the present difference value is not greater than the second threshold, the step S15 is executed.

Figure 10:
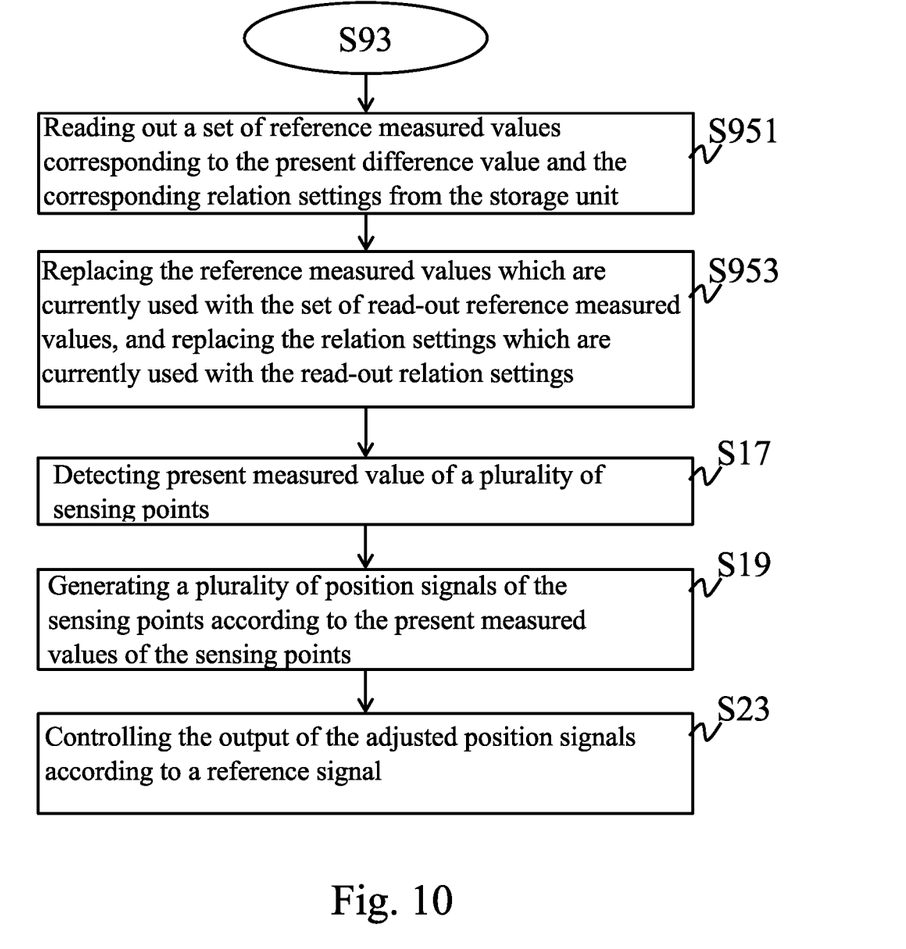
FIG. 10 is a flowchart showing details of the step S95.

In one embodiment of the step S95, as shown in FIG. 10, the control unit 128 reads a set of reference measured values corresponding to the present difference value and relation settings corresponding to the set of reference measured values from the storage unit 126 (step S951). Next, in the step S953, the control unit 128 refreshes the reference measured values which are currently used with the set of read reference measured values for further use in the step S13 (and the step S19). Further, in the step S953, the control unit 128 further replaces the relation settings which are currently used with the read relation settings for further use in the step S15.

In some embodiments, the signal detection of reference points can be used in determining the timing to refresh the background noises (i.e., the reference measured values). In other words, when the present difference value is not greater than the second threshold (step S93), instead of executing the step S15, the step S17 is executed. In the step S951, the set of read reference measured values corresponds to respective sensing points P(1,1)-P(n,m). Wherein, a set of reference measured values corresponding to different present difference values can be established in advance and stored in the storage unit 126. That is, the storage unit 126 stores a plurality of sets of reference measured values corresponding to different present difference values, and each set of reference measured values corresponds to respective sensing points P(1,1)-P(n,m). One of the sets of reference measured values is set to be used currently for executing the step S13 and the step S19.

It shall be understood that the order for executing the described steps can be varied according to different situations. Here, the storage unit 126 can be carried out by a single or a multiple storage element. The storage element can be utilized for storing or temporally storing software, firmware, information, signals, values, documents, or the combination thereof. And, the storage element may be, but not limited to, a volatile memory or a non-volatile memory.

According to the capacitive sensing device and the capacitive sensing method of the instant disclosure, the device detects the signals of the selected reference points in cycles. Based on the detection result, the default background noises (i.e., the reference measured values), and the relation settings for indicating the effect of temperature change to the position signals, the device can obtain the impact of temperature change on the position signals can be obtained rapidly and adjust the position signals correspondingly. Therefore, the accuracy of a signal-reading process can be maintained over time and the response speed for temperature change can be improved.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A capacitive sensing method, comprising:
   detecting present measured values of a plurality of reference points selected from a plurality of sensing points, wherein the sensing points are defined by electrodes intersected with one another and the sensing points are configured to form an array, and wherein the reference points are located at the periphery of the array;
   generating a present difference value according to the present measured values of the reference points and at least one reference measured value;
   obtaining a selected adjustment factor according to a relation setting and the present difference value, wherein the relation setting is the relationship between signal difference values and adjustment factors;
   detecting present measured values of the sensing points;
   generating a plurality of position signals of the sensing points according to the present measured values of the sensing points;
   adjusting the position signals according to the selected adjustment factor;
   controlling the output of the adjusted position signals according to a reference signal; and
   adjusting a detecting frequency of the present measured values of the reference points according to comparison of the present difference value and a first threshold.

2. The capacitive sensing method according to claim 1, wherein the step of detecting present measured values of a plurality of reference points selected from a plurality of sensing points further comprises:
   driving at least one electrode located at a first side of the array and at least one electrode located at a second side of the array from the electrodes, wherein the first side is opposite to the second side; and
   measuring at least one electrode located at a third side of the array and at least one electrode located at a fourth side of the array from the electrodes to obtain the present measured values of the reference points, wherein the third side is opposite to the fourth side.

3. The capacitive sensing method according to claim 1, wherein the step of detecting present measured values of a plurality of reference points selected from a plurality of sensing points further comprises:
   driving and measuring at least one electrode located at at least one side of the array to obtain the present measured values of the reference points.

4. The capacitive sensing method according to claim 1, wherein the electrodes comprise a plurality of first electrodes and a plurality of second electrodes intersected with the first electrodes, and wherein the step of detecting present measured values of a plurality of reference points selected from a plurality of sensing points further comprises:
   driving at least one of the first electrodes located at a first side of the array and at least one of the first electrodes located at a second side of the array, wherein the first side is opposite to the second side; and
   measuring a number of the second electrodes to obtain the present measured values of the reference points.

5. The capacitive sensing method according to claim 4, wherein any two of the measured second electrodes are spaced by at least one unmeasured second electrode.

6. The capacitive sensing method according to claim 1, wherein the electrodes comprise a plurality of first electrodes and a plurality of second electrodes intersected with the first electrodes, and wherein the step of detecting present measured values of a plurality of reference points selected from a plurality of sensing points further comprises:
   driving at least one of the first electrodes located at a first side of the array and at least one of the first electrodes located at a second side of the array, wherein the first side is opposite to the second side;
   measuring at least one of the second electrodes to obtain present measured values of some of the reference points;
   driving at least one of the second electrodes located at a third side of the array and a least one of the second electrodes located at a fourth side, wherein the third side is opposite to the fourth side; and
   measuring at least one of the first electrodes to obtain present measured values of the rest reference points.

7. The capacitive sensing method according to claim 6, wherein any two of the measured first electrodes is spaced by at least one unmeasured first electrode, and wherein any two of the measured second electrodes is spaced by at least one unmeasured second electrode.

8. The capacitive sensing method according to claim 1, wherein the array is divided into a sensing area and an invalid area located at the periphery of the sensing area, and the reference points are located in the invalid area.

9. The capacitive sensing method according to claim 1, wherein the step of adjusting the detecting frequency of the present measured values of the reference points according to comparison of the present difference value and the first threshold comprises:
   comparing the present difference value with the first threshold;
   increasing the detecting frequency of the present measured values of the reference points when the present difference value is greater than the first threshold.

10. The capacitive sensing method according to claim 1, wherein the step of adjusting the detecting frequency of the present measured values of the reference points according to comparison of the present difference value and the first threshold comprises:
   comparing the present difference value with the first threshold;
   increasing the detecting frequency of the present measured values of the reference points and reset a count value when the present difference value is greater than the first threshold;
   accumulating the count value when the present difference value is not greater than the first threshold;
   decreasing the detecting frequency of the present measured values of the reference points and reset the count value when the count value is greater or equal to a predetermined value; and
   retaining the same detecting frequency of the present measured values of the reference points when the count value is not reached to the predetermined value.

* * * * *